United States Patent
Bennati

(10) Patent No.: US 12,468,849 B2
(45) Date of Patent: Nov. 11, 2025

(54) METHOD, APPARATUS, AND COMPUTER PROGRAM PRODUCT FOR ESTIMATING THE PRIVACY RISK OF ANONYMIZED TRAJECTORY DATA

(71) Applicant: HERE GLOBAL B.V., Eindhoven (NL)

(72) Inventor: Stefano Bennati, Zurich (CH)

(73) Assignee: HERE GLOBAL B.V., Eindhoven (NL)

(*) Notice: Subject to any disclaimer, the term of this patent is extended or adjusted under 35 U.S.C. 154(b) by 100 days.

(21) Appl. No.: 17/809,372

(22) Filed: Jun. 28, 2022

(65) Prior Publication Data

US 2023/0418977 A1    Dec. 28, 2023

(51) Int. Cl.
G06F 21/62    (2013.01)

(52) U.S. Cl.
CPC .................. *G06F 21/6254* (2013.01)

(58) Field of Classification Search
CPC ... G06F 21/6254; G06F 21/6245; G06F 21/62
See application file for complete search history.

(56) References Cited

U.S. PATENT DOCUMENTS

| | | | |
|---|---|---|---|
| 10,540,519 B2 | 1/2020 | Zhang et al. | |
| 10,628,608 B2 | 4/2020 | Hebert et al. | |
| 11,042,648 B2 | 6/2021 | Ostadzadeh et al. | |
| 11,120,432 B2* | 9/2021 | Kurian | G06Q 20/3821 |
| 11,188,791 B2 | 11/2021 | Choudhury et al. | |
| 11,317,247 B1 | 4/2022 | Bennati et al. | |
| 11,768,959 B2* | 9/2023 | Viente | H04W 4/44 |
| | | | 701/28 |

(Continued)

FOREIGN PATENT DOCUMENTS

| WO | WO-2014030302 A1 * | 2/2014 | ......... G06F 21/6254 |
|---|---|---|---|
| WO | WO-2022090067 A1 * | 5/2022 | ............. G16B 20/20 |

OTHER PUBLICATIONS

Extended European Search Report for European Application No. 23182063.0 dated Oct. 30, 2023, 8 pages.

(Continued)

*Primary Examiner* — Tod R Swann
*Assistant Examiner* — Daniel Elahian
(74) *Attorney, Agent, or Firm* — ALSTON & BIRD LLP

(57) ABSTRACT

Embodiments described herein relate estimating a privacy level of an anonymized dataset based on an anonymization strategy selected using parameters of the dataset that form a dataset profile. Methods may include: receiving a dataset defining at least one trajectory; determining parameters of the dataset; generating a profile of the dataset based on the parameters of the dataset to establish a dataset profile; identifying a predetermined profile corresponding to the dataset profile; determining an anonymization strategy corresponding to the predetermined profile; anonymizing the dataset using the anonymization strategy to generate an anonymized dataset; and publishing the anonymized dataset for use with location-based services. According to some embodiments, identifying the predetermined profile corresponding to the dataset profile includes identifying a predetermined profile having parameters within a predefined degree of similarity of the parameters of the dataset.

20 Claims, 6 Drawing Sheets

(56) References Cited

U.S. PATENT DOCUMENTS

| | | | |
|---|---|---|---|
| 2021/0019425 A1 | 1/2021 | Ostadzadeh et al. | |
| 2021/0133590 A1 | 5/2021 | Amroabadi et al. | |
| 2021/0182402 A1* | 6/2021 | Bennati | G06F 21/577 |
| 2021/0374280 A1 | 12/2021 | Bennati et al. | |
| 2022/0180226 A1* | 6/2022 | McCarthy | G06F 21/6254 |
| 2023/0322080 A1* | 10/2023 | Liebau | G08G 1/0962 |
| | | | 701/36 |

OTHER PUBLICATIONS

Askin, Önder, Tim Kutta, and Holger Dette. "Statistical Quantification of Differential Privacy: A Local Approach." arXiv preprint arXiv:2108.09528 (2021).

Li et al., "On The Tradeoff Between Privacy and Utility in Data Publishing", KDD '09: Proceedings of the 15th ACM SIGKDD International Conference on Knowledge Discovery and Data Mining, (Jun. 2009), 9 pages.

* cited by examiner

METHOD, APPARATUS, AND COMPUTER PROGRAM PRODUCT FOR ESTIMATING THE PRIVACY RISK OF ANONYMIZED TRAJECTORY DATA

TECHNOLOGICAL FIELD

An example embodiment of the present disclosure relates to estimating the privacy risk of anonymized trajectory data, and more particularly, to estimating a privacy level of an anonymized dataset based on an anonymization strategy selected using parameters of the dataset that form a dataset profile.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for estimating a privacy level of an anonymized dataset based on an anonymization strategy selected using parameters of the dataset that form a dataset profile. According to an example embodiment, an apparatus is provided including at least one processor and at least one memory including computer program code, the at least one memory and computer program code configured to, with the processor, cause the apparatus to at least: receive a dataset defining at least one trajectory; determine parameters of the dataset; generate a profile of the dataset based on the parameters of the dataset to establish a dataset profile; identify a predetermined profile corresponding to the dataset profile; determine an anonymization strategy corresponding to the predetermined profile; anonymize the dataset using the anonymization strategy to generate an anonymized dataset; and publish the anonymized dataset for use with location-based services.

According to some embodiments, causing the apparatus to identify the predetermined profile corresponding to the dataset profile includes causing the apparatus to identify a predetermined profile having parameters within a predefined degree of similarity of the parameters of the dataset. Causing the apparatus of some embodiments to identify the predetermined profile corresponding to the dataset profile includes causing the apparatus to identify a predetermined profile having a predetermined number of parameters corresponding to the parameters of the dataset. According to certain embodiments, the parameters of the dataset include contextual identifiers of data within the dataset. The contextual identifiers of some embodiments include one or more of mobility data density, road functional class, or geographical area type. According to some embodiments, the apparatus is further caused to estimate a privacy level of the anonymized dataset based on a privacy level associated with the predetermined profile. The privacy level of an example embodiment is estimated using Maximum Privacy Loss. The privacy level of an example embodiment includes a measure of a difference between at least one anonymized and reconstructed dataset and a corresponding test dataset. According to some embodiments, a re-anonymization of the dataset based on a second anonymization strategy before publishing the anonymized dataset is triggered in response to the privacy level being below a predefined threshold.

Embodiments provided herein include a method including: receiving a dataset defining at least one trajectory; determining parameters of the dataset; generating a profile of the dataset based on the parameters of the dataset to establish a dataset profile; identifying a predetermined profile corresponding to the dataset profile; determining an anonymization strategy corresponding to the predetermined profile; anonymizing the dataset using the anonymization strategy to generate an anonymized dataset; and publishing the anonymized dataset for use with location-based services. According to some embodiments, identifying the predetermined profile corresponding to the dataset profile includes identifying a predetermined profile having parameters within a predefined degree of similarity of the parameters of the dataset.

According to certain embodiments, identifying the predetermined profile corresponding to the dataset profile includes identifying a predetermined profile having a predetermined number of parameters corresponding to the parameters of the dataset. According to certain embodiments, the parameters of the dataset include contextual identifiers of data within the dataset. The contextual identifiers of some embodiments include one or more of mobility data density, road functional class, or geographical area type. According to some embodiments, the method further includes estimating a privacy level of the anonymized dataset based on a privacy level associated with the predetermined profile. The privacy level of an example embodiment is estimated using Maximum Privacy Loss. The privacy level of an example embodiment includes a measure of a difference between at least one anonymized and reconstructed dataset and a corresponding test dataset. According to some embodiments, a re-anonymization of the dataset based on a second anonymization strategy before publishing the anonymized dataset is triggered in response to the privacy level being below a predefined threshold.

Embodiments provided herein include a computer program product including at least one non-transitory computer-readable storage medium having computer-executable program code portions stored therein, the computer-executable program code portions including program code instructions configured to: receive a dataset defining at least one trajectory; determine parameters of the dataset; generate a profile of the dataset based on the parameters of the dataset to establish a dataset profile; identify a predetermined profile corresponding to the dataset profile; determine an anonymization strategy corresponding to the predetermined profile; anonymize the dataset using the anonymization strategy to generate an anonymized dataset; and publish the anonymized dataset for use with location-based services.

According to some embodiments, causing the program code instructions to identify the predetermined profile corresponding to the dataset profile includes program code instructions to identify a predetermined profile having parameters within a predefined degree of similarity of the parameters of the dataset. The program code instructions of some embodiments to identify the predetermined profile corresponding to the dataset profile include program code instructions to identify a predetermined profile having a predetermined number of parameters corresponding to the parameters of the dataset. According to certain embodiments, the parameters of the dataset include contextual identifiers of data within the dataset. The contextual identifiers of some embodiments include one or more of mobility data density, road functional class, or geographical area type. The computer program product of some embodiments further includes program code instructions to estimate a privacy level of the anonymized dataset based on a privacy level associated with the predetermined profile. The privacy level of an example embodiment is estimated using Maximum Privacy Loss. The privacy level of an example embodiment includes a measure of a difference between at least one anonymized and reconstructed dataset and a corresponding test dataset. According to some embodiments, a re-anonymization of the dataset based on a second anonymization strategy before publishing the anonymized dataset is triggered in response to the privacy level being below a predefined threshold. Embodiments described herein further include a computer program product having computer-executable program code portions stored therein, the computer executable program code portions including program code instructions configured to perform any method described herein.

Embodiments provided herein include an apparatus including: means for receiving a dataset defining at least one trajectory; means for determining parameters of the dataset; means for generating a profile of the dataset based on the parameters of the dataset to establish a dataset profile; means for identifying a predetermined profile corresponding to the dataset profile; means for determining an anonymization strategy corresponding to the predetermined profile; means for anonymizing the dataset using the anonymization strategy to generate an anonymized dataset; and means for publishing the anonymized dataset for use with location-based services. According to some embodiments, the means for identifying the predetermined profile corresponding to the dataset profile include means for identifying a predetermined profile having parameters within a predefined degree of similarity of the parameters of the dataset.

According to certain embodiments, the means for identifying the predetermined profile corresponding to the dataset profile include means for identifying a predetermined profile having a predetermined number of parameters corresponding to the parameters of the dataset. According to certain embodiments, the parameters of the dataset include contextual identifiers of data within the dataset. The contextual identifiers of some embodiments include one or more of mobility data density, road functional class, or geographical area type. According to some embodiments, the apparatus further includes means for estimating a privacy level of the anonymized dataset based on a privacy level associated with the predetermined profile. The privacy level of an example embodiment is estimated using Maximum Privacy Loss. The privacy level of an example embodiment includes a measure of a difference between at least one anonymized and reconstructed dataset and a corresponding test dataset. According to some embodiments, a re-anonymization of the dataset based on a second anonymization strategy before publishing the anonymized dataset is triggered in response to the privacy level being below a predefined threshold.

BRIEF DESCRIPTION OF THE DRAWINGS

Figure 1:
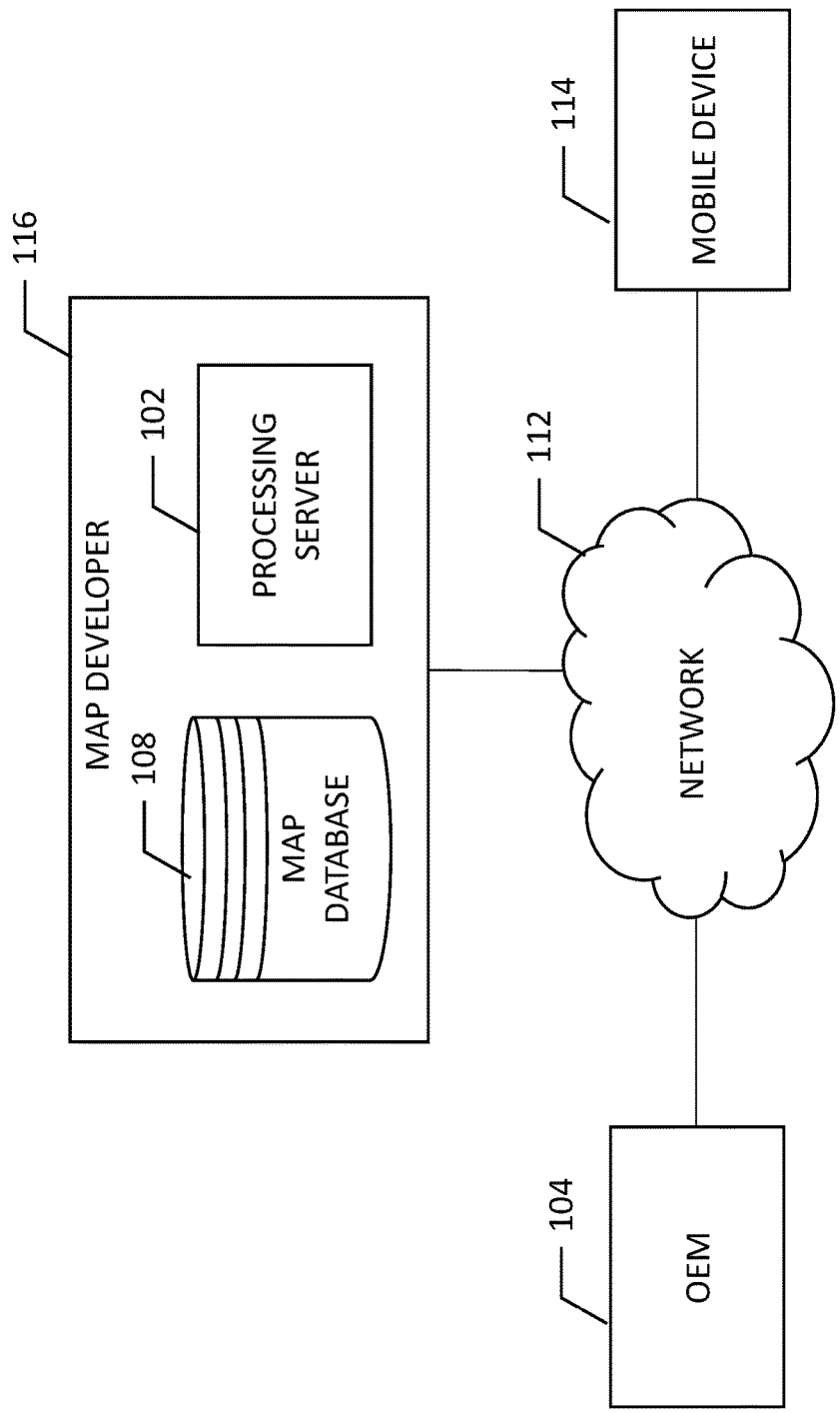
Figure 2:
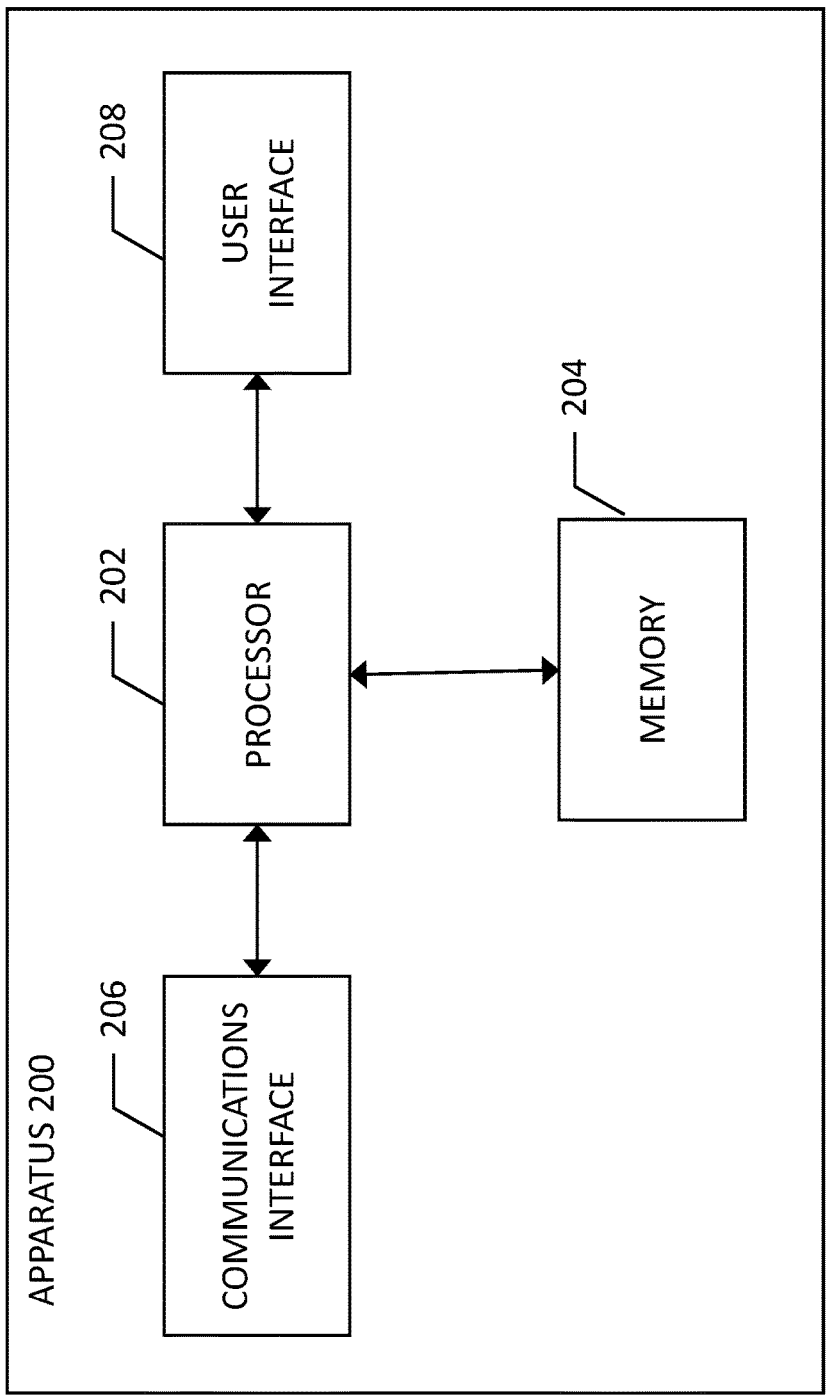
Figure 3:
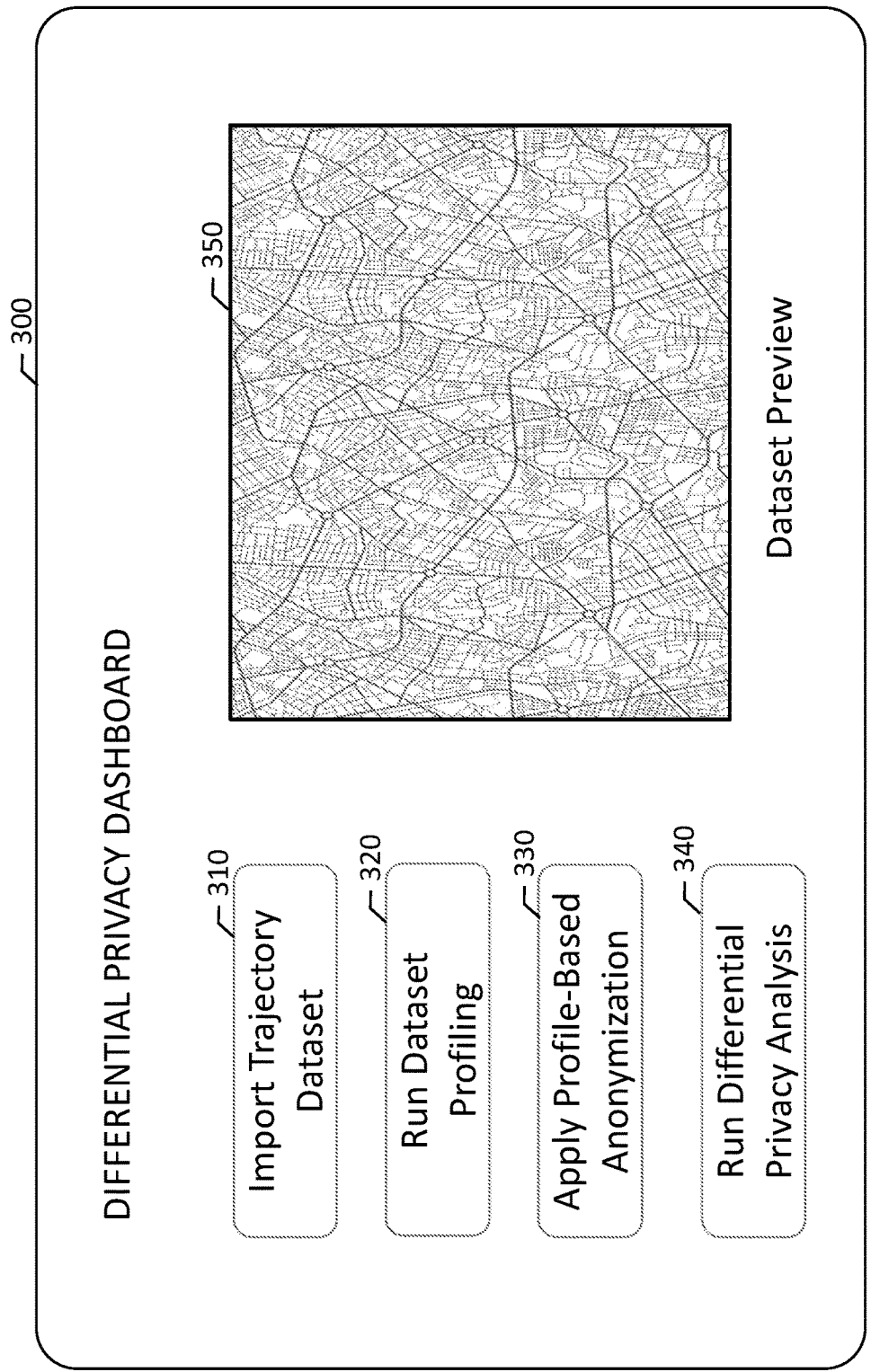
Figure 4:
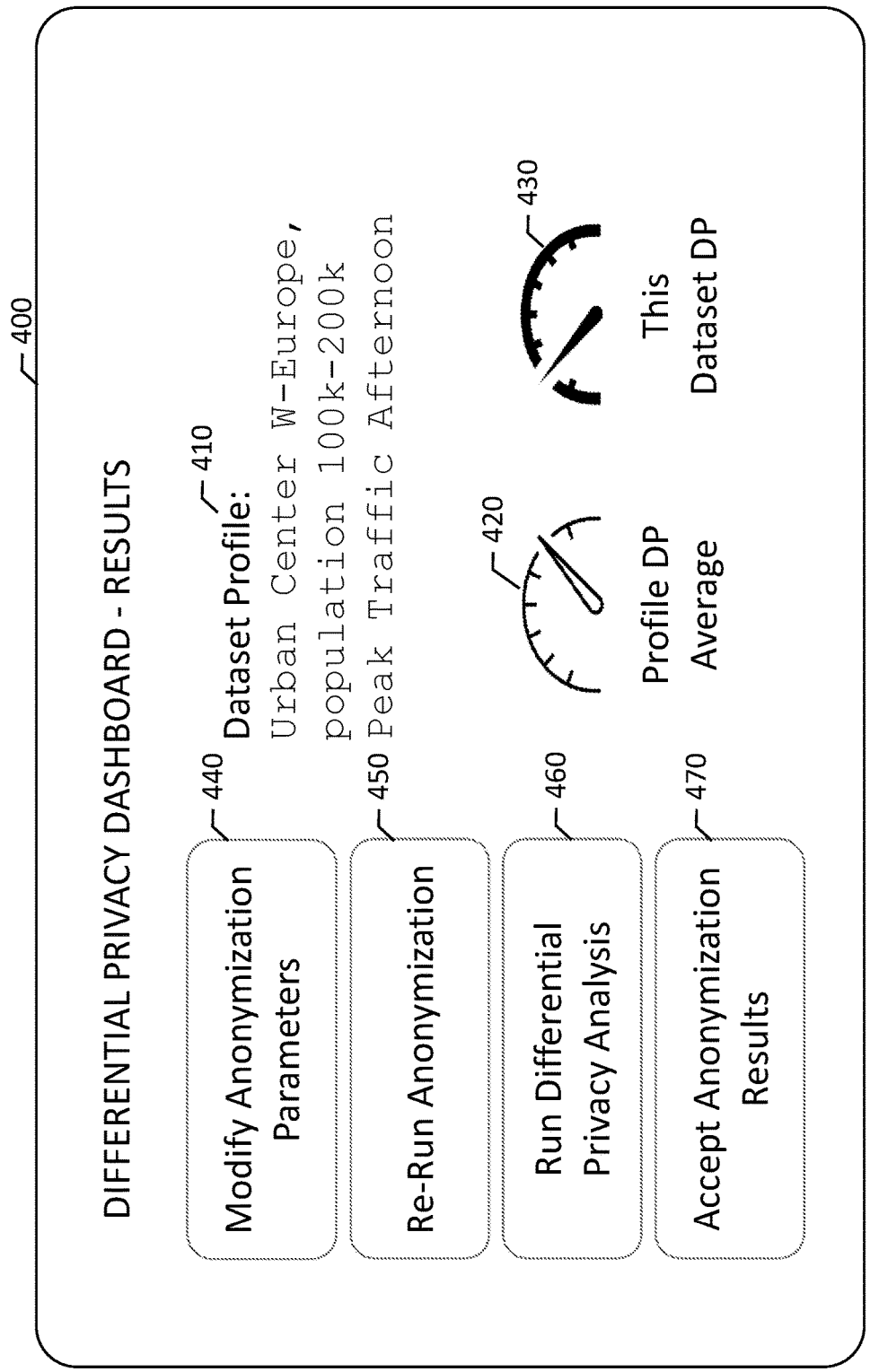
Figure 5:
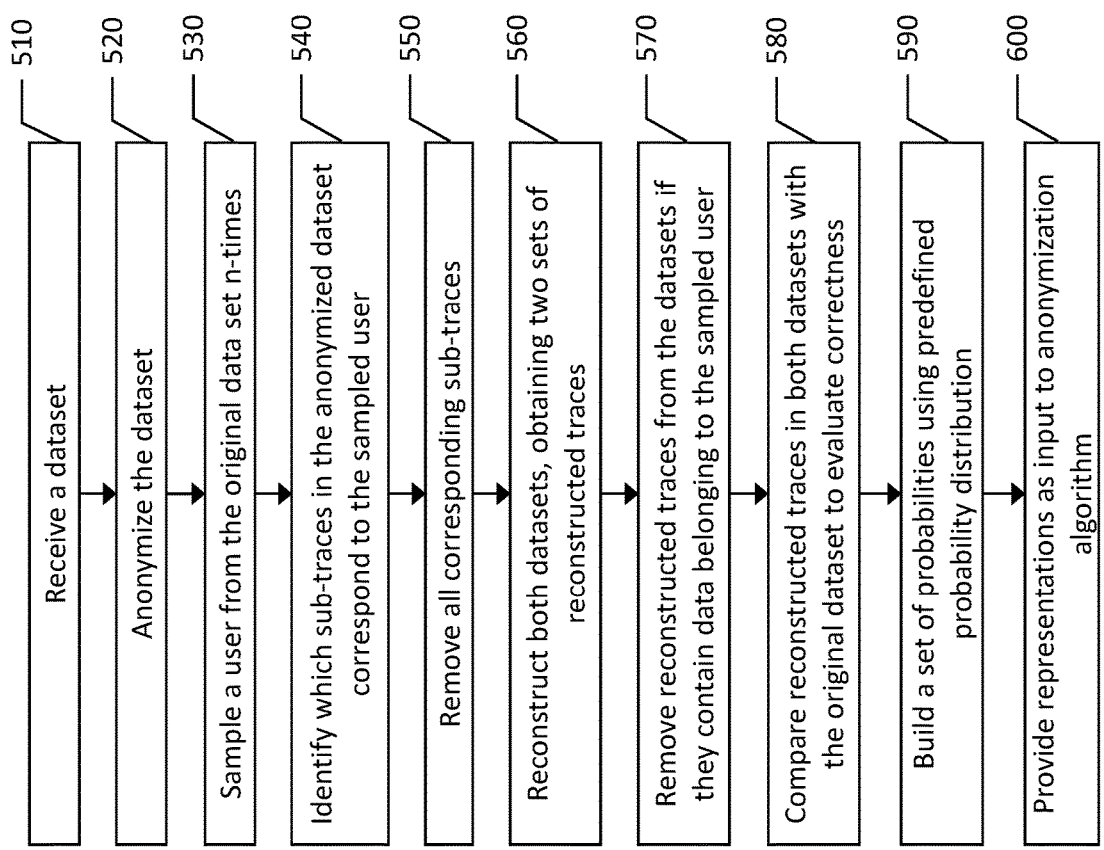
Figure 6:
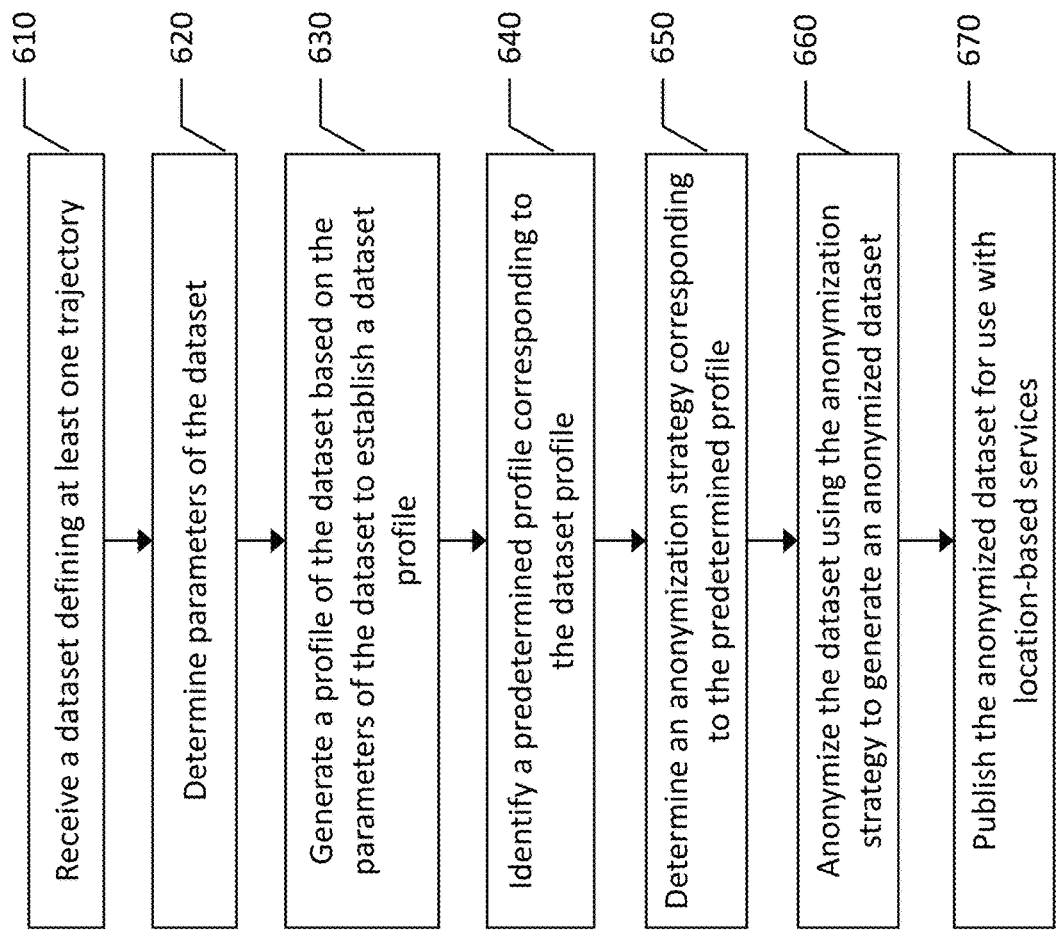

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for estimating the privacy risk for disclosure of trajectory data according to an example embodiment of the present disclosure;

FIG. 3 illustrates a user interface for determining a privacy level for a dataset according to an example embodiment of the present disclosure;

FIG. 4 illustrates a dashboard user interface for presenting privacy level information for a dataset according to an example embodiment of the present disclosure;

FIG. 5 is a flowchart of a method for generating neighboring datasets according to an example embodiment of the present disclosure; and FIG. 6 is a flowchart of a method for estimating privacy risk for disclosure of trajectory data according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories (trajectory data) identifies the movement of a user over time in the form of a dataset. Anonymization of trajectories or a dataset while providing sufficient information for location-based services to be effective requires a balance to be struck between valuable trajectory information including location information of probe data points while also introducing ambiguity for anonymization. Various anonymization algorithms may be applied to trajectory data that obfuscates a source of the trajectory data, thereby preserving the anonymity of a user.

Location-based services (LBS) such as real-time traffic information, fleet management, navigation, etc. are based on the analysis of mobility data that users of such services provide. Location data marketplaces exchange mobility data between buyers and sellers for the purposes of providing such services. Exchanged location data must be anonymized to comply with regulations and/or the privacy expectations of users. Sellers want to understand what level of anonymization the data has in order to evaluate risks. Embodiments provided herein provide an indication of the privacy of anonymized data based on the underlying dataset.

A method, apparatus, and computer program product are provided herein in accordance with an example embodiment for estimating a privacy level or risk associated with anonymized mobility data in a dataset, and more particularly, to evaluating mobility data to determine an anonymization strategy and determining a privacy level associated with the mobility data anonymized using the determined anonymization strategy. Mobility data in the form of probe data points or trajectories for a vehicle and/or mobile device can facilitate the use of location-based services for a variety of functions. However, the probe data and trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which the privacy level or risk is estimated based on an anonymization strategy applied to mobility data based on parameters of the mobility data in a dataset. The privacy level or risk is a measure of how likely a source of mobility data can be reidentified from the anonymized mobility data. Location information and more specifically, trajectory information data can be gathered and shared in a manner that anonymizes the source of the information and makes identification of the source difficult. Embodiments provided herein estimate the privacy risk associated with trajectory data based statistical analysis of anonymized mobility data. A measure of the privacy risk represents the ability of an adversary to associate the target trajectory with the source. Embodiments thereby determine how difficult it is estimated to be to establish to whom a target trajectory belongs. A privacy risk is a measure established as to the difficulty an adversary would have to associate a target trajectory with a source. If a privacy risk is low (e.g., below a predetermined threshold measure), information associated with the target trajectory may be provided to location-based services such that they may render a service related to the target trajectory and the source thereof.

To provide a method of estimating the privacy level or risk based on an anonymization strategy applied to mobility data, with the anonymization strategy selected based on parameters of the mobility data, a system as illustrated in FIG. 1 may be used. FIG. 1 illustrates a communication diagram of an example embodiment of a system for implementing example embodiments described herein. The illustrated embodiment of FIG. 1 includes a map developer 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the mobile device 114 may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, functional class, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike routes, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through. The ADAS of an example embodiment provided herein can generate observations along a trajectory. These observations can be for use with location-based services; however, the observation data may require anonymization. Embodiments described herein can determine an anonymization strategy based on the observation data and estimate the degree of anonymization based on the identified anonymization strategy. The anonymized data, used by location-based service providers, can provide services through the ADAS that can facilitate control of a vehicle, such as through autonomous control, route guidance, etc.

The processing server 102 may receive probe data (e.g., trajectory data), directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route to produce a trajectory of the vehicle. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for measuring and quantifying the linkability of trajectory data, and more particularly, to measuring and quantifying the linkability of trajectory data based on similarities to other trajectory data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms or strategies on data. Privacy-enhancing algorithms function by removing or altering features of the data that may remove privacy, and this operation typically renders the data less accurate and thus less valuable for the location-based service provider.

Embodiments described herein determine a privacy level or risk associated with anonymized mobility data by evaluating mobility data to determine an anonymization strategy and determining a privacy level associated with the mobility data anonymized using the determined anonymization strategy. This privacy level represents the difficulty with which it is estimated that an adversary would be able to match the target trajectory with the source. Embodiments estimate the privacy risk related to releasing a dataset containing mobility data in the form of information associated with a target trajectory. The risk relates to the personal information that can be inferred by comparing this data with other available data, such as additional trajectories.

Trajectory data as described herein is defined as a set of data points, each data point including a location and a timestamp. The location may be in the form of latitude and longitude, and potentially altitude. The location can be any form of identifying information not limited to latitude/longitude, such as cartesian coordinates or other identifiers. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data and information associated with trajectories to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations.

State-of-the-art anonymization algorithms reduce re-identification risk of trajectory data by blurring the relation between locations that may allow re-identification of the individual that produced the trajectory. For example, an adversary may re-identify a trajectory by noticing recurring patterns, such as overnight stays at the same address (likely the home) or periodic visits to a gym or hospital. These relations can be blurred by subdividing trajectories in sub-trajectories with a new pseudonym, as the pseudonym is the attribute that connects seemingly independent location data points from a trajectory. For example, a trajectory that defines the movement of a person across multiple days may be split in multiple trajectories with different pseudonyms. Masking the relation between data in different days can hide repeated patterns such as overnight stays that can re-identify the person associated with the trajectory, such as by their home address.

An adversary may re-identify a trajectory based on additional attributes that strongly correlate with the trajectory. For example, trajectories produced by a brand new car could be re-identified by disclosing information about the year of production of the vehicle. Similarly, in a small town, a single individual may own a particular brand of car in the town, such that disclosing information about the brand of the car could identify the owner and could allow re-identification of associated trajectories.

Additionally, anonymization efforts may be hindered if other attributes of the data give away the relation that has been masked via splitting of a trajectory and pseudonymization. State-of-the-art measures of privacy risk consider the likelihood of re-identifying a trajectory from information about the mobility data such as speed, heading, locations, points-of-interest, etc. Information from additional attributes is not considered in the privacy risk.

Privacy metrics are used to establish the privacy level or risk associated with anonymized data. Differential privacy is an example of such a metric. Differential privacy offers an intuitive and general definition of privacy based on probabilities. Anonymization algorithms and strategies offer some sort of differential privacy anonymization technique such that differential privacy can be used as the reference metric when anonymizing data. However, other metrics can be used to measure and report privacy level of anonymized data. Standard differential privacy techniques are tailored to the release of aggregated statistics from tabular data, such as census data or healthcare statistics. Differential privacy as a metric may not fit all use cases such as releasing disaggregated mobility data. Differential privacy anonymization is generally obtained by treating data with one of a specific set of algorithms known to support differential privacy. These algorithms can anonymize data by adding a specific kind of noise to the aggregated data, such as Laplacian noise, which produces output that conforms to differential privacy. Because of the noisy nature of the output of these algorithms, the output can render mobility data less than ideal for location-based services, and adversely affect location-based services that are provided based on noisy data.

According to example embodiments provided herein, privacy level or privacy risk for a trajectory dataset is estimated based on the application of an anonymization strategy on the trajectory dataset, where the anonymization strategy is established based on parameters of the trajectory dataset itself. Embodiments of the present disclosure employ a privacy estimation algorithm, such as Maximum Privacy Loss, to estimate the privacy level, which can include a differential privacy level, provided by an anonymization algorithm. The privacy level of anonymized data is dataset-specific as parameters of the dataset impact the privacy level achieved by a particular anonymization strategy. Embodiments described herein provide a dataset specific estimate of the privacy level based on a particular anonymization strategy that enables evaluation of which anonymization strategy is most suitable for a particular dataset, thus informing the definition of an anonymization strategy that optimizes the privacy/utility trade-off for a specific dataset use case.

To estimate the privacy level, embodiments provided herein develop and build a catalog that associates privacy estimates to anonymization strategies and features of a dataset. Datasets include a variety of parameters that can be used as context for the dataset to better identify a recommended anonymization strategy that will yield the most favorable results (i.e., a higher privacy level with lower risk). The parameters or features of a dataset can include: spatial features such as area classification (e.g., urban, rural), a region, or county; temporal features such as season, time of day, traffic density; population features such as number of trajectories, density, etc.; map features such as road functional classes, number of intersections, etc.; and parameters of the anonymization strategy. The dataset can further include one or more attributes of the data, such as a vehicle manufacturer, IP address, etc. The catalog of example embodiments is used to identify patterns across privacy estimates that enables identification of an appropriate or recommended anonymization strategy for a dataset not previously encountered. This capability reduces the resources needed to perform the estimation of privacy level and improves processing efficiency.

The estimate of privacy level of a dataset is tailored to the use case of releasing anonymized trajectory data, where the anonymized data does not contain noise. This is in contrast to standard differential privacy methods where noisy aggregated statistics are released. The lack of noise improves the quality of location-based services that rely on the trajectory dataset. By using different anonymization algorithms or possibly the same algorithm with different parameters on each run, the results of the metrics can be evaluated and provide for a decision regarding whether the anonymized dataset is deemed fit for release, requires further anonymization, and/or which of the datasets provides the highest differential privacy score.

Dataset pairs include an original dataset and a neighboring dataset. In a tabular data scenario, a neighboring dataset is a dataset where the record related to a specific individual or data source is removed. For anonymized trajectory data, a record corresponds to a trace or trajectory of an individual. The neighboring dataset is derived from the anonymized dataset by removing all sub-traces referring to one specific individual. Anonymization is applied once to the original dataset to ensure that the candidates for reconstruction are the same across both datasets.

The reconstruction model is intended to test the quality of anonymization or anonymization level by attempting to undo the anonymization which can be used to identify a source of the data. The algorithm of the reconstruction model looks to each sub-trace and estimates which other sub-traces among a set of candidates is the correct continuation in the dataset in an attempt to reconstruct an entire trajectory from the sub-traces. Training data is needed to train the reconstruction model, and the reconstruction model is tested using customer data in the form of individual trajectories or datasets. Anonymization is performed on trajectories/datasets of the test data, and the anonymized trajectories/datasets of the test data are processed through the trained reconstruction model to generate dataset pairs. The anonymization algorithm, such as a Maximum Privacy Loss algorithm, can be run on the dataset pairs to determine a differential privacy score. The reconstruction model attempts to reverse the anonymization process to identify a source of a dataset. The anonymization algorithm is used to create dataset pairs and determine the difference between the datasets of the dataset pairs to determine how well the reconstruction model reconstructed the original dataset. The differential privacy between the dataset pairs is a measure of the quality of the anonymization by virtue of how successful the reconstruction model was at reconstructing the original dataset.

The probability of correctly reconstructing a trajectory determines the privacy level and privacy risk of the anonymized dataset. Each candidate in a set is associated to a weight that describes the certainty about that candidate being the correct reconstruction. Assuming an adversary has no further knowledge to aid the choice of a candidate, the desired approach is to sample one candidate with uniform probability, weighted on the certainty provided by the reconstruction algorithm. For each individual, the probability of correctly reconstructing its dataset is computed as the product of the probability of choosing the correct candidate for each of the sub-traces associated with that individual. For example, if the individual dataset is split into three sub-traces, the probability will be the product of the probability of choosing the correct reconstruction for each of the three sub-traces.

The catalog is generated through machine learning using training data and testing data. Training data includes a wide variety of datasets having a wide variety of parameters to ensure a breadth of training data sufficient to cover datasets of real world customer data that will be compared to data in the catalog. An anonymization strategy is selected and applied to the training data. A reconstruction model is trained on the anonymized training data to produce dataset pairs.

The process of building the catalog continues with anonymization of the test data including individual trajectories or datasets. Reconstruction of an anonymized test dataset is performed using the reconstruction model to obtain the list of candidates from the test dataset. Among the individual trajectories/datasets contained in the test data, a number are sampled where the sampling can be informed by features of the trajectories themselves. For example, trajectories with few sub-traces may be excluded as they are likely to have a lower impact on the privacy level. The sampling can be informed by features of the map/region. For example, regions of the map with sparse data may be excluded as this data is likely to have a lower impact on the privacy level. The sampling can further be informed by features of the candidate trajectories. For example, individual trajectories may be excluded if the reconstruction has certain properties such as having only one candidate, or one candidate with a weight that is much larger than any other candidate, thus rendering the trajectory source more identifiable. Sampling should be representative of the test data, with outliers and extreme cases not considered.

A number of neighboring datasets are obtained by removing from the test data the datasets related to one specific individual (all sub-traces) among the number of sampled datasets. From this, a number of pairs of datasets are produced including test datasets and corresponding neighboring datasets. For each dataset pair, a list of candidates from the test dataset is obtained. The neighboring dataset is reconstructed using the reconstruction model described above to obtain a list of candidates. The list of sub-traces associated with each individual (the correct reconstructions) are obtained to understand the true trajectories. The individual identifier from the neighboring dataset is removed as there is nothing to compare against. For each individual in the data, the process is repeated for the test dataset and the neighboring dataset. All candidates are identified that are associated to all sub-traces of that individual. The weights or probabilities related to the correct candidate for each sub-trace are collected and multiplied. From this, a list of pairs containing the reconstruction probabilities are returned on the test and neighboring datasets. A statistical technique such as Maximum Privacy Loss (MPL) can be applied to these probabilities to estimate the privacy level that the algorithm obtains on the current test dataset.

FIG. 5 is a flowchart illustrating a process for generating a neighboring dataset for use in an anonymization estimation algorithm, such as Maximum Privacy Loss. As illustrated, a dataset is received at 510. This dataset includes location data associated with a trajectory. The dataset is anonymized at 520, such as by breaking the dataset into sub-traces of the trajectory. The anonymization at 520 is performed only once to ensure datasets are comparable. A user is sampled from the original dataset at 530 n-times. The sampling is informed using features of the map and/or the trajectory. The choices of sampling can speed up the statistical process of finding the maximum loss in some examples. At 540, the sub-traces re identified in the anonymized dataset that correspond to the sampled user. These corresponding sub-traces are removed at 550. All corresponding traces should be excluded as the sampled user is the differential unit for differential privacy. Both datasets are reconstructed at 560 to obtain two sets of reconstructed traces. The reconstruction will differ because the neighboring dataset necessarily has fewer sub-trajectories. Reconstructed traces are removed at 570 from the first datasets if they contain data belonging to the sampled user. These traces cannot be compared with the neighboring dataset as such data is not present in the neighboring dataset. Reconstructed traces of both datasets are compared at 580 with the original dataset to evaluate the correctness of the traces. A set of probabilities are built at 590 using a predefined probability distribution, such as the uniform distribution. The distribution models the ability of an adversary to reconstruct a trajectory and identify a source (user) of the trajectory. The representations generated are provided at 600 to the anonymization estimation algorithm, such as the Maximum Privacy Loss algorithm. The Maximum Privacy Loss algorithm takes these representations from 600 as input and uses that input to estimate the privacy score, which is used to determine the accuracy of reconstruction.

The privacy level established through the process above can be used to compare different anonymization strategies based on utility and privacy metrics such that a preferred or best-performing anonymization strategy can be selected with the most desirable trade-off between utility and privacy. The catalog is built through the training and testing of a wide range of datasets with a wide variety of differences in parameters. The catalog can then be used for new datasets, where the parameters of a new dataset are identified and compared against those in the catalog to identify a dataset within the catalog having similar parameters, or parameters within a predefined degree of similarity. Once identified, the anonymization strategy that was determined to be preferred for the dataset in the catalog having similar parameters can be applied to the new dataset, with an estimated anonymization level established based on the anonymization level of the dataset in the catalog. This process provides a library of anonymization strategies along with the datasets that they work best on based on the different parameters of the datasets.

The catalog of an example embodiment includes a plurality of profiles, where each profile corresponds to a set of parameters. These profiles are generated based on one or more datasets, and the one or more datasets share the same or similar parameters forming the set of parameters. These profiles enable new datasets of probe data points defining trajectories to be received and associated with a corresponding profile. The association can be based on a predefined proportion of the parameters of the new dataset matching those of a profile (or match within a predefined degree of similarity) or an overall similarity of the parameters of the new dataset with the profile. Optionally, parameters can be weighted, with some parameters of a dataset having a greater influence over the best anonymization strategy to be applied. For example, mobility data density within an area proximate a dataset has an outsized impact on the anonymization strategy since large volumes of mobility data within an area renders reconstruction more difficult. Hence, the mobility data density parameter could be more heavily weighted. Conversely, mobility data season of the year may be less likely to influence the best anonymization strategy, particularly within areas that have little mobility changes season-to-season. As such, the mobility data season parameter may be of a lower weight. These parameters are contextual identifiers of the mobility data within a dataset offering context of the mobility data that is used to determine how to most appropriately anonymize the dataset.

Embodiments of the present disclosure provide a risk estimating mechanism to measure and quantify the privacy risk associated with publishing an anonymized dataset for use with location-based services. According to some embodiments, an analysis of an entire dataset of trajectories may be performed to determine if the dataset can be used for provision of location-based services without incurring a substantial privacy risk.

The estimated privacy risk generated by example embodiments herein may be used to determine further actions. For example, if the privacy risk estimate satisfies a predetermined criterion (e.g., meeting a minimum privacy risk score), this indicates that the risk of linking the dataset or a trajectory within a dataset with the source is low, and the dataset may be published to a location-based service provider. If a privacy risk estimate fails to satisfy a predetermined criteria, the risk of linking the dataset with the source may be too high, and further actions may be taken. For example, if the privacy risk estimate is too high, the dataset may be further anonymized or re-anonymized using a different anonymization strategy, such as by using an anonymization algorithm (e.g., splitting and gapping) on the dataset to reduce the privacy risk and improve a privacy score.

FIG. 3 illustrates an example embodiment of a user interface for determining the privacy level for a dataset. As shown, the user interface 300, which may correspond to user interface 208, includes user interface elements such as a first user interface element 310 to identify a trajectory dataset for importing. The dataset may be previewed in preview window 350, which may depict the trajectory on a map, for example. A second user interface element 320 is provided that is used to run dataset profiling on the imported trajectory dataset selected from first user interface element 310. The dataset profiling can establish a profile for the imported trajectory dataset, which can then be used to determine an anonymization strategy. At third user interface element 330, the profile-based anonymization strategy is applied. Based on the anonymized dataset using the profile-based anonymization strategy, the differential privacy analysis can be run using the fourth user interface element 340. The dataset preview can optionally provide a graphical illustration of anonymized trajectory information enabling a visual review of how effective anonymization was and how useful the anonymized trajectory data may be for use with different location-based services.

FIG. 4 illustrates an example embodiment of a dashboard user interface presenting results of differential privacy analysis. As shown, the dashboard 400 presents the dataset profile 410, where the dataset profile includes contextual information regarding the dataset. Specifically, the dataset profile 410 of the example is a Western European urban center with a population between 100,000 and 200,000, and temporally the profile is peak afternoon traffic. The privacy level is shown for the profile differential privacy average 420 and this particular dataset differential privacy 430. As shown, the average differential privacy for this particular profile is relatively high, while this specific dataset did not fare too well using the selected anonymization strategy with a relatively low differential privacy 430. The dashboard 400 provides an option to change and hopefully improve the differential privacy, such as by modifying the anonymization parameters through a first user interface element 440. Once the parameters are modified, the anonymization can be re-run using a second interface element 450, running the differential privacy analysis on the new anonymized dataset with the third user interface element 460, and accepting the anonymization results with the fourth user interface element 470 if the differential privacy 430 for this particular dataset reaches an acceptable level.

FIGS. 5 and 6 illustrate a flowcharts depicting methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for estimating the privacy level of a dataset containing at least one trajectory based on a catalog of datasets having profiles and privacy estimates. According to the illustrated embodiment, a dataset is received at 610 defining at least one trajectory. Parameters of the dataset are determined at 620. A profile of the dataset is generated at 630 based, at least in part, on the parameters of the dataset to establish a dataset profile. A predetermined profile corresponding to the dataset profile is identified at 640, where the predetermined profile may be stored, for example, in a catalog of dataset profiles. An anonymization strategy is determined at 650 corresponding to the predetermined profile. For example, the predetermined profile may be associated with a specific anonymization strategy determined to provide a sufficient level of privacy while also ensuring a high level of usability of the anonymized dataset for location-based services. The dataset is anonymized at 660 using the anonymization strategy to generate an anonymized dataset. The anonymized dataset is published at 670 for use with location-based services.

In an example embodiment, an apparatus for performing the method of FIGS. 5 and/or 6 above may comprise a processor (e.g., the processor 202) configured to perform some or each of the operations (510-600 and/or 610-670) described above. The processor may, for example, be configured to perform the operations (510-600 and/or 610-670) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-600 and/or 610-670 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the at least one processor, cause the apparatus to at least:
receive a dataset defining at least one trajectory, wherein the at least one trajectory comprises probe data points defining movement of a user over time;
determine parameters of the dataset;
generate a profile of the dataset based on the parameters of the dataset to establish a dataset profile;
identify a predetermined profile corresponding to the dataset profile from a catalog of datasets having profiles and privacy level estimates, the catalog associating the privacy level estimates to anonymization strategies;
determine an anonymization strategy corresponding to the predetermined profile;
anonymize the dataset using the anonymization strategy to generate an anonymized dataset;
estimate a privacy level of the anonymized dataset based on a privacy level estimate associated with the predetermined profile; and
publish the anonymized dataset for use with location-based services.

2. The apparatus of claim 1, wherein causing the apparatus to identify the predetermined profile corresponding to the dataset profile comprises causing the apparatus to:
identify the predetermined profile within the catalog having parameters within a predefined degree of similarity of the parameters of the dataset.

3. The apparatus of claim 1, wherein causing the apparatus to identify the predetermined profile corresponding to the dataset profile comprises causing the apparatus to:
identify the predetermined profile within the catalog having a predetermined number of parameters corresponding to the parameters of the dataset.

4. The apparatus of claim 1, wherein the parameters of the dataset comprise contextual identifiers of data within the dataset.

5. The apparatus of claim 4, wherein the contextual identifiers include one or more of mobility data density, road functional class, or geographical area type.

6. The apparatus of claim 1, wherein the privacy level is estimated using Maximum Privacy Loss.

7. The apparatus of claim 6, wherein the privacy level comprises a measure of a difference between at least one anonymized and reconstructed dataset and a corresponding test dataset.

8. A method comprising:
receiving a dataset defining at least one trajectory, wherein the at least one trajectory comprises probe data points defining movement of a user over time;
determining parameters of the dataset;
generating a profile of the dataset based on the parameters of the dataset to establish a dataset profile;
identifying a predetermined profile corresponding to the dataset profile from a catalog of datasets having profiles and privacy level estimates, the catalog associating the privacy level estimates to anonymization strategies;
determining an anonymization strategy corresponding to the predetermined profile;
anonymizing the dataset using the anonymization strategy to generate an anonymized dataset;

estimating a privacy level of the anonymized dataset based on a privacy level estimate associated with the predetermined profile; and publishing the anonymized dataset for use with location-based services.

9. The method of claim 8, wherein identifying the predetermined profile corresponding to the dataset profile comprises:

identifying the predetermined profile within the catalog having parameters within a predefined degree of similarity of the parameters of the dataset.

10. The method of claim 8, wherein identifying the predetermined profile corresponding to the dataset profile comprises:

identifying the predetermined profile within the catalog having a predetermined number of parameters corresponding to the parameters of the dataset.

11. The method of claim 8, wherein the parameters of the dataset comprise contextual identifiers of data within the dataset.

12. The method of claim 11, wherein the contextual identifiers include one or more of mobility data density, road functional class, or geographical area type.

13. The method of claim 8, wherein the privacy level is estimated using Maximum Privacy Loss.

14. The method of claim 8, wherein in response to the privacy level being below a predefined threshold, triggering a re-anonymization of the dataset based on a second anonymization strategy before publishing the anonymized dataset.

15. A computer program product comprising at least one non-transitory computer-readable storage medium having computer-executable program code portions stored therein, the computer-executable program code portions comprising program code instructions configured to:

receive a dataset defining at least one trajectory, wherein the at least one trajectory comprises probe data points defining movement of a user over time;

determine parameters of the dataset;

generate a profile of the dataset based on the parameters of the dataset to establish a dataset profile;

identify a predetermined profile corresponding to the dataset profile from a catalog of datasets having profiles and privacy level estimates, the catalog associating the privacy level estimates to anonymization strategies;

determine an anonymization strategy corresponding to the predetermined profile;

anonymize the dataset using the anonymization strategy to generate an anonymized dataset;

estimate a privacy level of the anonymized dataset based on a privacy level estimate associated with the predetermined profile; and publish the anonymized dataset for use with location-based services.

16. The computer program product of claim 15, wherein the program code instructions to identify the predetermined profile corresponding to the dataset profile comprise program code instructions to:

identify the predetermined profile within the catalog having parameters within a predefined degree of similarity of the parameters of the dataset.

17. The computer program product of claim 16, wherein program code instructions to identify the predetermined profile corresponding to the dataset profile comprise program code instructions to:

identify the predetermined profile within the catalog having a predetermined number of parameters corresponding to the parameters of the dataset.

18. The computer program product of claim 15, wherein the parameters of the dataset comprise contextual identifiers of data within the dataset.

19. The apparatus of claim 1, wherein each of the profiles in the catalog corresponds to a set of parameters and is generated based on one or more datasets and the one or more datasets share at least some parameters forming the set of parameters.

20. The method of claim 8, wherein each of the profiles in the catalog corresponds to a set of parameters and is generated based on one or more datasets and the one or more datasets share at least some parameters forming the set of parameters.

* * * * *